United States Patent
Mantelli et al.

(10) Patent No.: US 9,861,078 B1
(45) Date of Patent: Jan. 9, 2018

(54) LEASH PACK

(71) Applicants: Matthew Wesley Mantelli, Aliso Viejo, CA (US); Neddie John Sherbanee, Irvine, CA (US)

(72) Inventors: Matthew Wesley Mantelli, Aliso Viejo, CA (US); Neddie John Sherbanee, Irvine, CA (US)

( * ) Notice: Subject to any disclaimer, the term of this patent is extended or adjusted under 35 U.S.C. 154(b) by 38 days.

(21) Appl. No.: 14/925,287

(22) Filed: Oct. 28, 2015

Related U.S. Application Data

(60) Provisional application No. 62/089,418, filed on Dec. 9, 2014.

(51) Int. Cl.
*A01K 27/00* (2006.01)

(52) U.S. Cl.
CPC .......... *A01K 27/008* (2013.01); *A01K 27/003* (2013.01); *A01K 27/006* (2013.01)

(58) Field of Classification Search
CPC .................................................. A01K 27/008
USPC .................. D30/153; 224/42.11; D3/321
See application file for complete search history.

(56) References Cited

U.S. PATENT DOCUMENTS

| | | | | |
|---|---|---|---|---|
| D344,184 S | * | 2/1994 | Barker | 224/42.11 |
| 5,387,037 A | * | 2/1995 | Daitch | B42F 7/08 150/112 |
| 5,441,017 A | * | 8/1995 | Lindsay | A01K 27/003 119/161 |
| 5,718,192 A | * | 2/1998 | Sebastian | A01K 27/006 119/795 |
| 5,727,500 A | * | 3/1998 | Conboy | A01K 23/005 119/174 |
| 5,890,639 A | * | 4/1999 | Hancock | A45C 3/00 224/42.11 |
| 6,019,067 A | * | 2/2000 | Carey | A01K 27/006 119/795 |
| 6,035,809 A | * | 3/2000 | Fingerett | A01K 27/004 119/796 |
| 6,085,695 A | * | 7/2000 | Miller | A01K 27/006 119/795 |
| D438,000 S | * | 2/2001 | Couchon | D3/201 |
| 6,199,737 B1 | * | 3/2001 | Ringelstetter | E01H 1/1206 150/108 |
| 6,237,533 B1 | * | 5/2001 | Rodriguez | A01K 27/006 119/161 |
| 6,257,473 B1 | * | 7/2001 | Ringelstetter | E01H 1/1206 119/795 |
| D463,074 S | * | 9/2002 | Couchon | D3/231 |
| 7,367,286 B2 | * | 5/2008 | Beaupre | A01K 27/006 119/792 |
| 7,757,911 B2 | * | 7/2010 | Barker | A45C 3/14 224/153 |
| D651,767 S | * | 1/2012 | Dias | D30/153 |
| D685,957 S | * | 7/2013 | Schiffman | D3/226 |
| D702,894 S | * | 4/2014 | Bayless | D3/226 |

(Continued)

*Primary Examiner* — Justin Larson
(74) *Attorney, Agent, or Firm* — Eric Karich; Karich & Associates

(57) ABSTRACT

A leash pack has first and second storage compartment panels that includes storage compartments for holding pet walking articles. First and second connector straps connect top edges of the first and second storage compartment panels for hanging the leash pack on a leash. Connectors are disposed on inner surfaces for removably joining the first and second storage compartment panels.

17 Claims, 7 Drawing Sheets

(56) References Cited

U.S. PATENT DOCUMENTS

| | | | | |
|---|---|---|---|---|
| 8,839,745 B1 | * | 9/2014 | Johnston | A01K 27/003 |
| | | | | 119/769 |
| D724,843 S | * | 3/2015 | Abbott | D3/301 |
| D727,577 S | * | 4/2015 | Lanich | D30/153 |
| D733,978 S | * | 7/2015 | Bayless | D3/226 |
| 9,078,417 B1 | * | 7/2015 | Lees | A45F 5/021 |
| D739,985 S | * | 9/2015 | Mantelli | D3/231 |
| D771,323 S | * | 11/2016 | Whitefield | D30/153 |
| 2004/0200871 A1 | * | 10/2004 | Han | A45C 13/36 |
| | | | | 224/576 |
| 2010/0269763 A1 | * | 10/2010 | Kraft | A01K 27/006 |
| | | | | 119/795 |
| 2015/0144072 A1 | * | 5/2015 | Whitefield | A01K 27/008 |
| | | | | 119/795 |

* cited by examiner

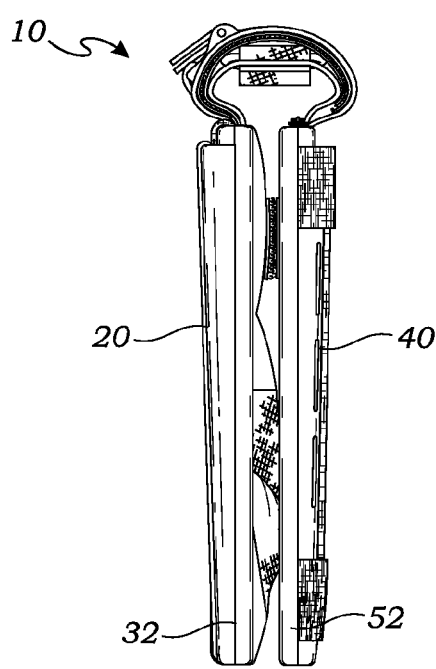
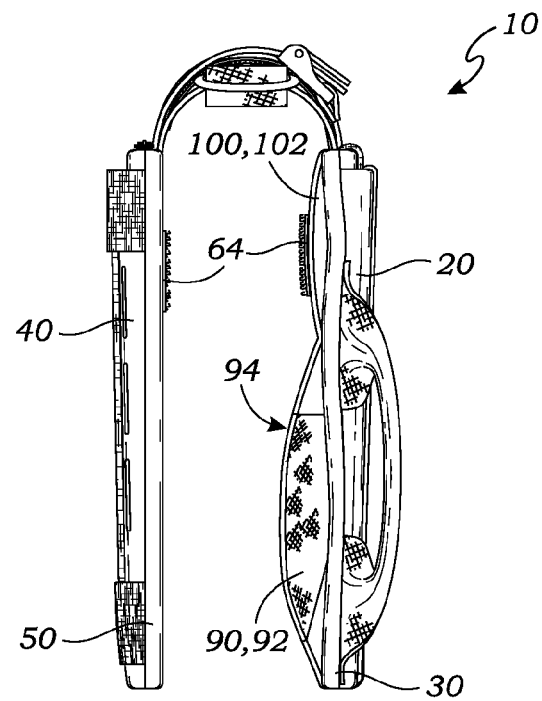
Fig. 6    Fig. 7
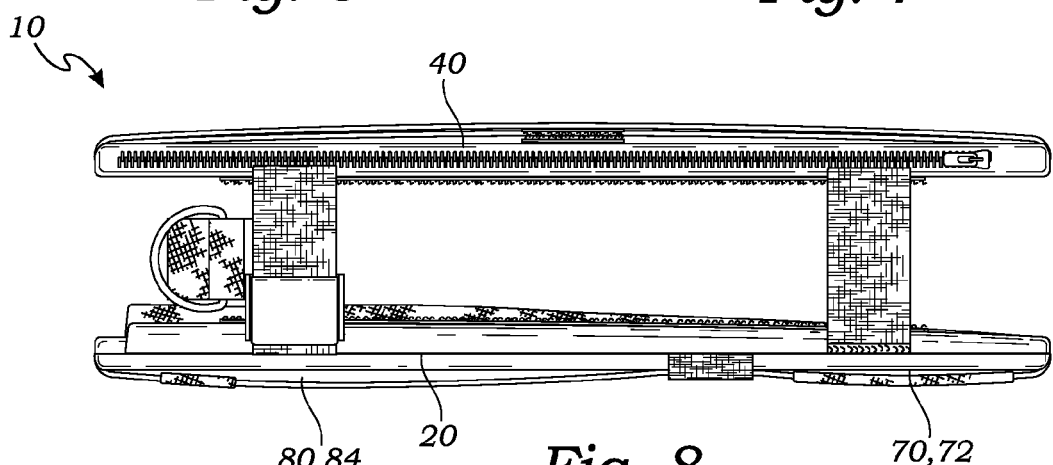
Fig. 8
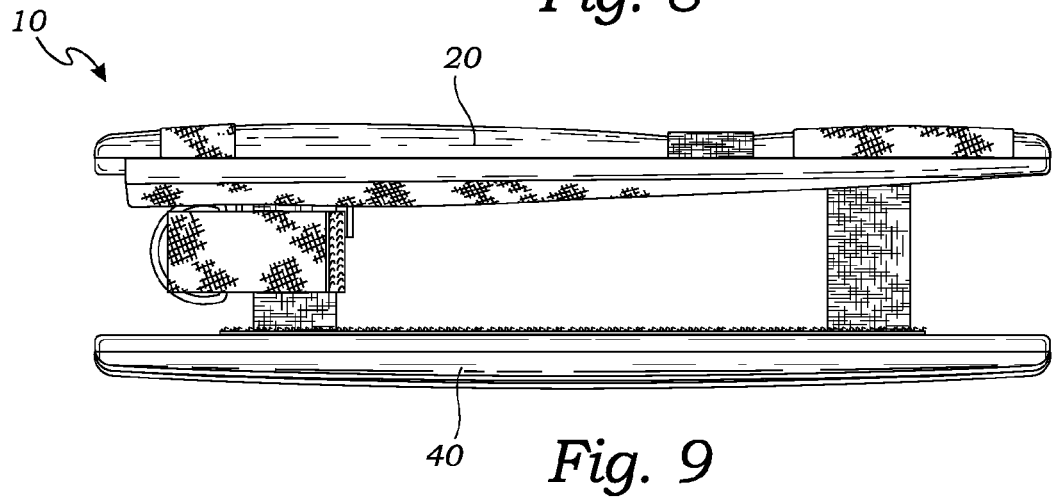
Fig. 9

LEASH PACK

CROSS-REFERENCE TO RELATED APPLICATIONS

This application for a utility patent claims the benefit of U.S. Provisional Application No. 62/089,418, filed Dec. 9, 2014.

BACKGROUND OF THE INVENTION

Field of the Invention

This invention relates generally to pet accessories, and more particularly to a small bag or pack that is mounted on a leash for storing and providing easy access to small items and accessories during walking of an animal.

Description of Related Art

The prior art teaches a wide variety of bags that can be attached to a leash, so that the bag and its contents are maintained in association with the leash. Examples of pertinent prior art devices include the following:

Lindsay, U.S. Pat. No. 5,441,017, teaches a disposable bag dispenser that is adapted to be attached to a conventional leash. The cylindrical dispenser houses a roll of disposable bags dispensed through a slit in the side of the housing as needed for use in cleaning the pet's waste. A pair of fastening straps are mounted to the side of the cylindrical dispenser for removably mounting the cylindrical dispenser to the leash.

Conboy, U.S. Pat. No. 5,727,500, describes a leash-mounted storage device includes a cylindrical front pouch, and a rear pouch, attached together and forming a channel therebetween. The front pouch includes a front opening for receiving a supply of disposable bags for picking up pet droppings. The rear pouch includes a top opening for receiving dirty bags after they are filled with animal waste. First and second hook-and-loop fastening straps are attached to the front pouch adjacent the opposite ends of the channel. The storage device is attached to a pet leash by slipping the leash through the channel, wrapping the first fastening strap through the hand loop of the leash, and wrapping the second fastening strap around an intermediate portion of the leash. Thus the storage device is securely attached to the leash. Instead of holding pet droppings, the storage device may also be used for holding a variety of other pet related items, such as pet toys, pet medication, water container, water dish, etc., or it may be used for holding personal items, such as keys, wallet, etc.

Carey, U.S. Pat. No. 6,019,067, teaches an article-carrying receptacle for attachment to a leash. The receptacle includes a body portion for holding articles placed therein while providing access to the contents thereof by a free hand of the individual. The receptacle is securable to the leash with a pair of tabs. A closable opening is conveniently provided along the length of the receptacle for accessing the interior thereof.

Ringelstetter, U.S. Pat. No. 6,257,473, teaches a pet waste collection pouch that includes an interior open-topped chamber for holding plastic bags of animal waste. The pouch further includes a flap portion that includes interior and exterior opening pockets on opposite sides thereof. The pockets include plastic waste-disposal bags, personal effects, and other items.

Sebastian, U.S. Pat. No. 5,718,192, teaches a carrying bag that includes a flap for covering the bag. The bag may be carried by hand, or the flap may be positioned over the leash for removably attaching the bag to the leash.

The prior art teaches various examples of bags, pouches, and similar devices that may be attached to a leash, and which may hold various accessories related to the dog. The prior art does not teach, however, a leash pack that includes the unique structures and functions of the present invention, as described in greater detail below.

SUMMARY OF THE INVENTION

The present invention teaches certain benefits in construction and use which give rise to the objectives described below.

The present invention provides a leash pack for use with a leash. The leash pack includes first and second storage compartment panels that includes storage compartments for holding pet walking articles. First and second connector straps connect top edges of the first and second storage compartment panels, and connectors are disposed on inner surfaces for removably joining the first and second storage compartment panels.

A primary objective of the present invention is to provide a leash pack having advantages not taught by the prior art.

Another objective is to provide a leash pack that may be easily attached to a leash so that articles stored in the leash pack are kept associated with the leash, so that they are available any time a pet is taken for a walk.

A further objective is to provide a leash pack that maintains an even balance on either side of the leash, so that the leash pack does not interfere with the use of the leash.

Other features and advantages of the present invention will become apparent from the following more detailed description, taken in conjunction with the accompanying drawings, which illustrate, by way of example, the principles of the invention.

BRIEF DESCRIPTION OF THE DRAWING

The accompanying drawings illustrate the present invention. In such drawings:

FIG. 6 is a rear elevational view of the leash pack in the folded configuration, illustrating how lateral connectors connect the first and second storage compartment panels;

FIG. 7 is a front elevational view of the leash pack in the folded configuration, illustrating a first compartment opening and a second compartment opening along a front edge of the first storage compartment panel;

FIG. 8 is top plan view of the leash pack;

FIG. 9 is a bottom plan view thereof; and

DETAILED DESCRIPTION OF THE INVENTION

The above-described drawing figures illustrate the invention, a leash pack 10 that may be removably mounted on a leash 12 (i.e., a dog leash, or similar device). The leash pack 10 enables a pet owner to maintain a variety of pet related accessories in association with the leash 12, so that they are always conveniently available when taking the dog (or other animal) for a walk. The leash pack 10 also provides a convenient method of carrying personal items (e.g., a cell phone, keys, etc.) while walking the dog or other animal.

Figure 1:
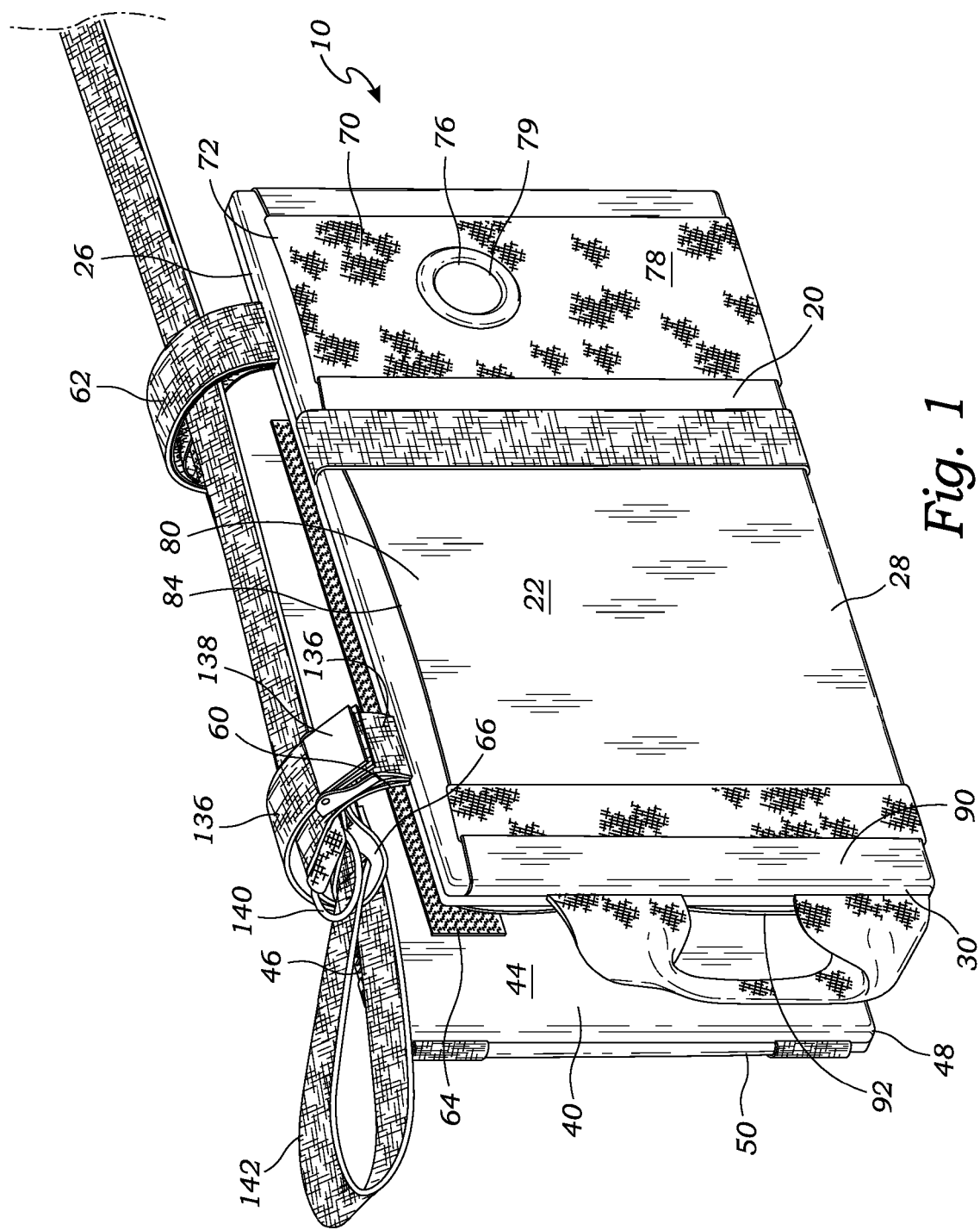
FIG. 1 is a perspective view of a leash pack according to one embodiment of the present invention, illustrating first and second storage compartment panels of the leash pack in a folded configuration and mounted on a standard animal leash.

FIG. 1 is a perspective view of the leash pack 10 according to one embodiment of the present invention, illustrating first and second storage compartment panels 20 and 40 of the leash pack 10 in a folded configuration and mounted on a standard animal leash 12. In the embodiment of FIG. 1, each of the first and second storage compartment panels 20 and 40 includes generally planar body which may be generally rectangular in construction, although other shapes may also be used in alternative embodiments. In this embodiment, the first and second storage compartment panels 20 and 40 each include an outer surface 22, 42 (best shown in FIG. 4), and an opposed inner surface 24, 44 (best shown in FIG. 5) that extend to a top edge 26, 46, a bottom edge 28, 48, a front side edge 30, 50, and a rear side edge 32, 52, respectively (as shown in FIGS. 1-5).

As shown in FIG. 1, the first and second storage compartment panels 20 and 40 are connected by at least one connector strap, in this embodiment a first connector strap 60 and a second connector strap 62 so that the first and second storage compartment panels 20 and 40 are connected together and spaced apart from each other a short distance (e.g., about 2-5 inches). For purposes of this application, the term "about" is hereby defined to mean +/−10%. An inner surface connector 64 is disposed on the inner surface 24 and 44 of each of the first and second storage compartment panels 20 and 40 for removably joining the first and second storage compartment panels 20 and 40. In the present embodiment, the inner surface connectors 64 are hooks and loops fasteners (i.e., VELCRO®), although any fasteners known in the art may be used (e.g., snaps, buttons, zippers, etc.).

Figure 5:
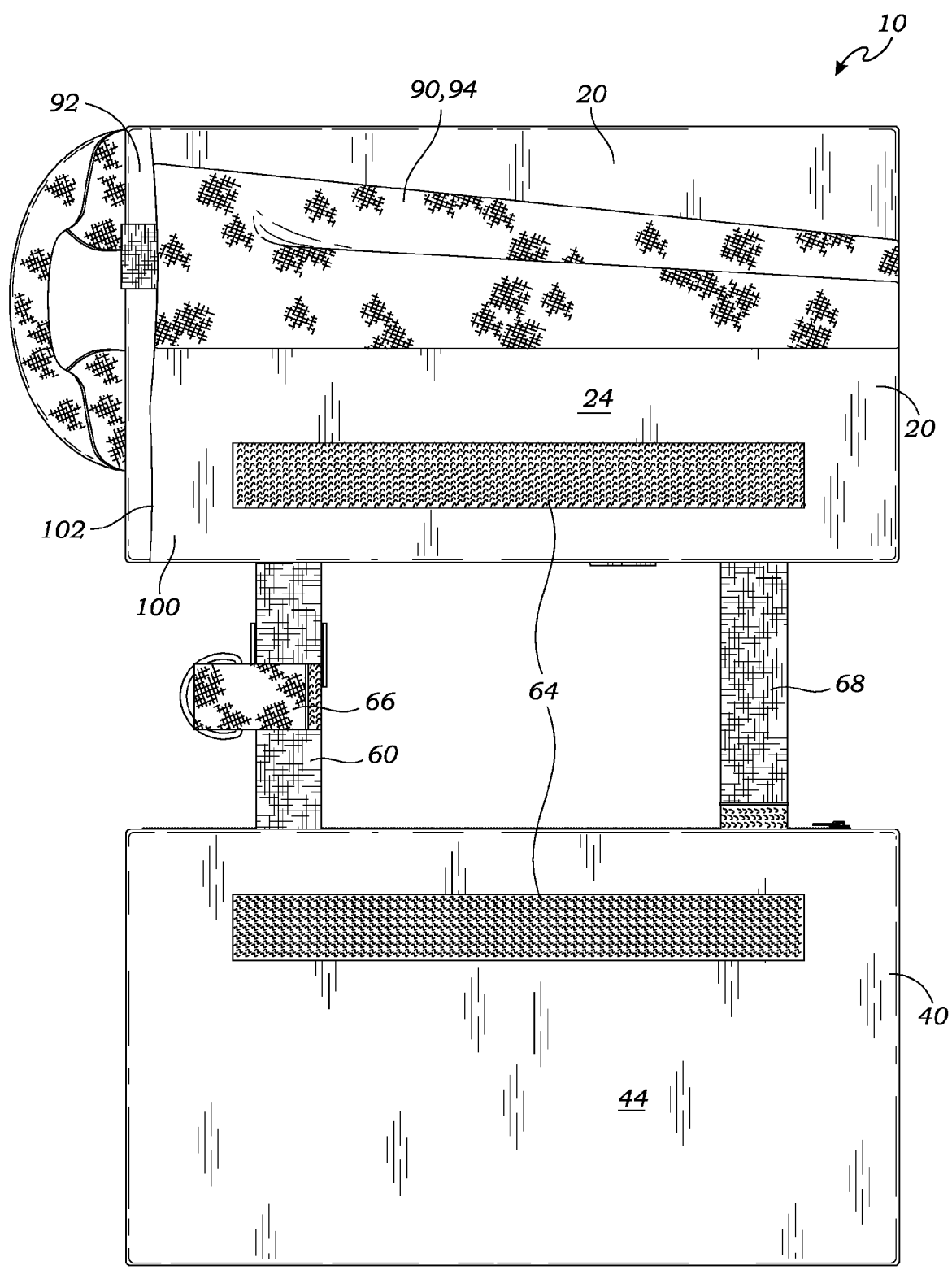
FIG. 5 is a bottom plan view thereof.

As illustrated in FIG. 1, in use, the leash pack 10 is positioned over the leash 12 so that the first and second connector straps 60 and 62 extend over and around the leash 12, with the first and second storage compartment panels 20 and 40 on either side of the leash 12 and hanging downwardly from the leash 12 by the first and second connector straps 60 and 62. The inner surface connectors 64 of the first and second storage compartment panels 20 and 40, shown more clearly in FIGS. 5 and 6, are removably connected together, thereby locking the leash pack 10 into position on the leash 12.

At least one stabilization strap, in this case first and second stabilization straps 66, 68, may be included to secure the leash pack 10 to the leash 12. In this embodiment, each of the first and second connector straps 60 and 62 includes one of the stabilization straps 66, 68, respectively. Each of the stabilization straps 66 and 68 may be any form of suitable strap, lace, cord, or similar element, and in this embodiment are elastic straps that include hooks and loops fasteners for securing the strap once it has been wrapped around the leash 12. One of the stabilization straps 66 and 68 may be wrapped around the leash 12, through a handle loop of the leash 12, so that the leash pack 10 cannot slide down the leash 12 during use.

Figure 2:
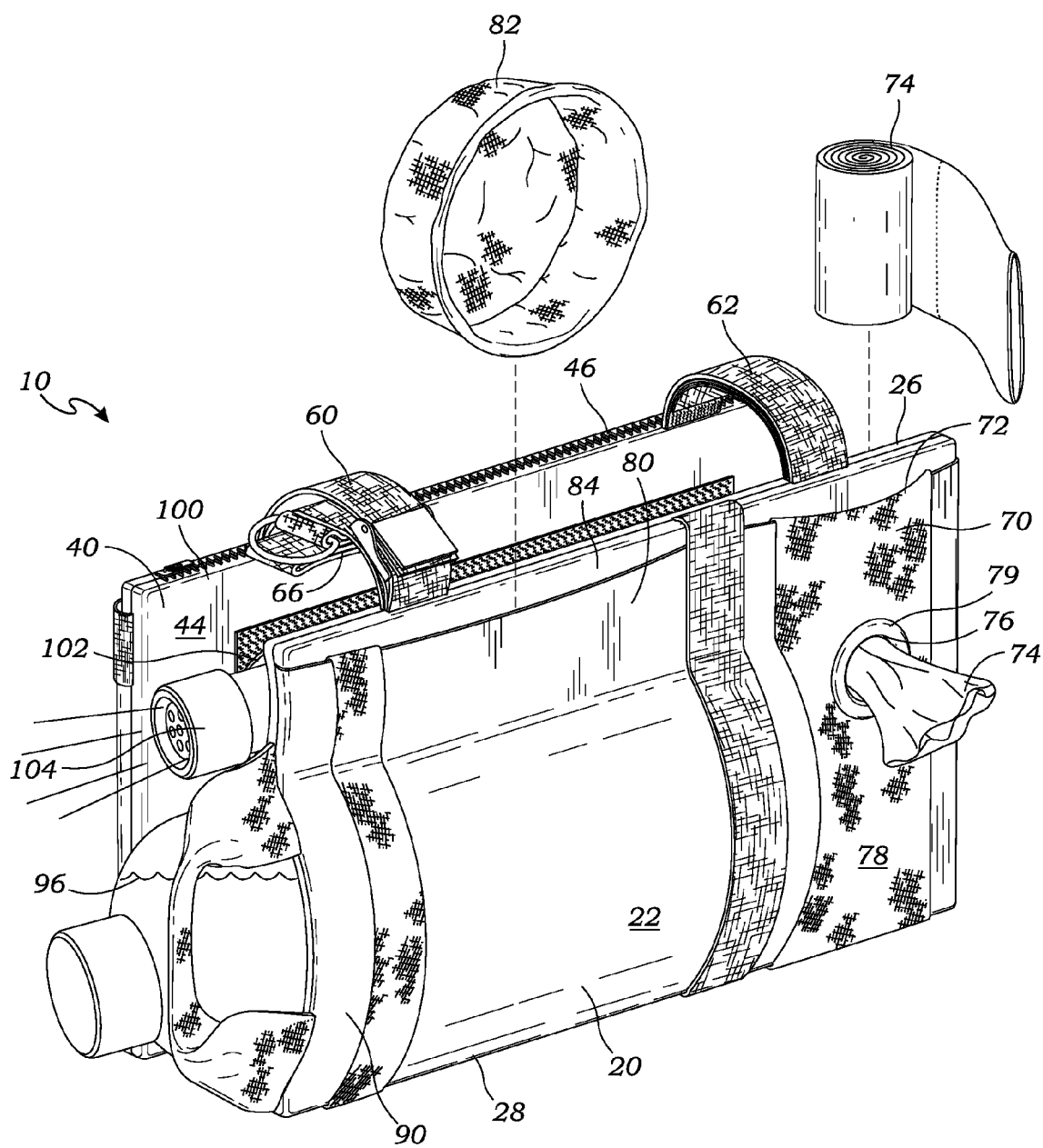
FIG. 2 is an exploded perspective view of the leash pack, illustrating compartments that hold various accessories that may be included in the leash pack.

FIG. 2 is an exploded perspective view of the leash pack 10, illustrating at least one storage compartment 20 that may be formed in the first storage compartment panel 20 to hold various pet related accessories that may be included in the leash pack 10. In this embodiment, at least one storage compartment formed in the first storage compartment panel 20 includes a baggie compartment 70, a bowl compartment 80, a water bottle sleeve 90, and an additional compartment 100 for holding a flashlight 104.

In this embodiment, the baggie compartment 70 includes an opening 72 adjacent the top edge 26 of the first storage compartment panel 20, through which at least one baggie 74 may be placed. Typically a roll of the baggies may be included, and dispensed sequentially through the a dispensing orifice 76 that extends through a front baggie compartment wall 78 for dispensing the at least one baggie, and a reinforcing ring 79 (e.g., made of metal, plastic, or other sturdy material) may strengthen the dispensing orifice 76 and facilitate the dispensing process.

In the embodiment of FIG. 2, the bowl compartment 80 is sized and shaped to receive a portable pet bowl 82. The bowl compartment 80 includes an opening 84 that is, in this embodiment, adjacent the top edge 26 of the first storage compartment panel 20, and through which the portable pet bowl 82 may be placed. The portable pet bowl 82 may be removed while walking the dog, or while at a dog park or other location, and filled with water (e.g., from the water bottle), food, treats, etc., for consumption by the dog. Following use, the portable pet bowl 82 may be returned to the bowl compartment 80.

The water bottle sleeve 90 may include a water bottle opening 92 that is, in this embodiment, formed in part by the front edge 30 of the first storage compartment panel 20. The water bottle sleeve 90 is sized and shaped to receive a water bottle 96, and may include a sleeve wall 94 (shown in FIG. 5) that is elastic, to facilitate insertion of the water bottle 96, and to also frictionally hold the water bottle 96 in place, despite size differences that can be expected between different brands of water bottles.

The additional compartment 100, included in the present embodiment, and may be used for holding any number of additional items, and may therefore have a wide range of sized and shapes. In this embodiment, the additional compartment has an opening 102 that is sized, shaped, and otherwise adapted for holding a flashlight 104. Those skilled in the art may devise a range of alternative constructions for holding other items that would be useful when walking a pet, and such alternatives are considered within the scope of the present invention.

Figure 3:
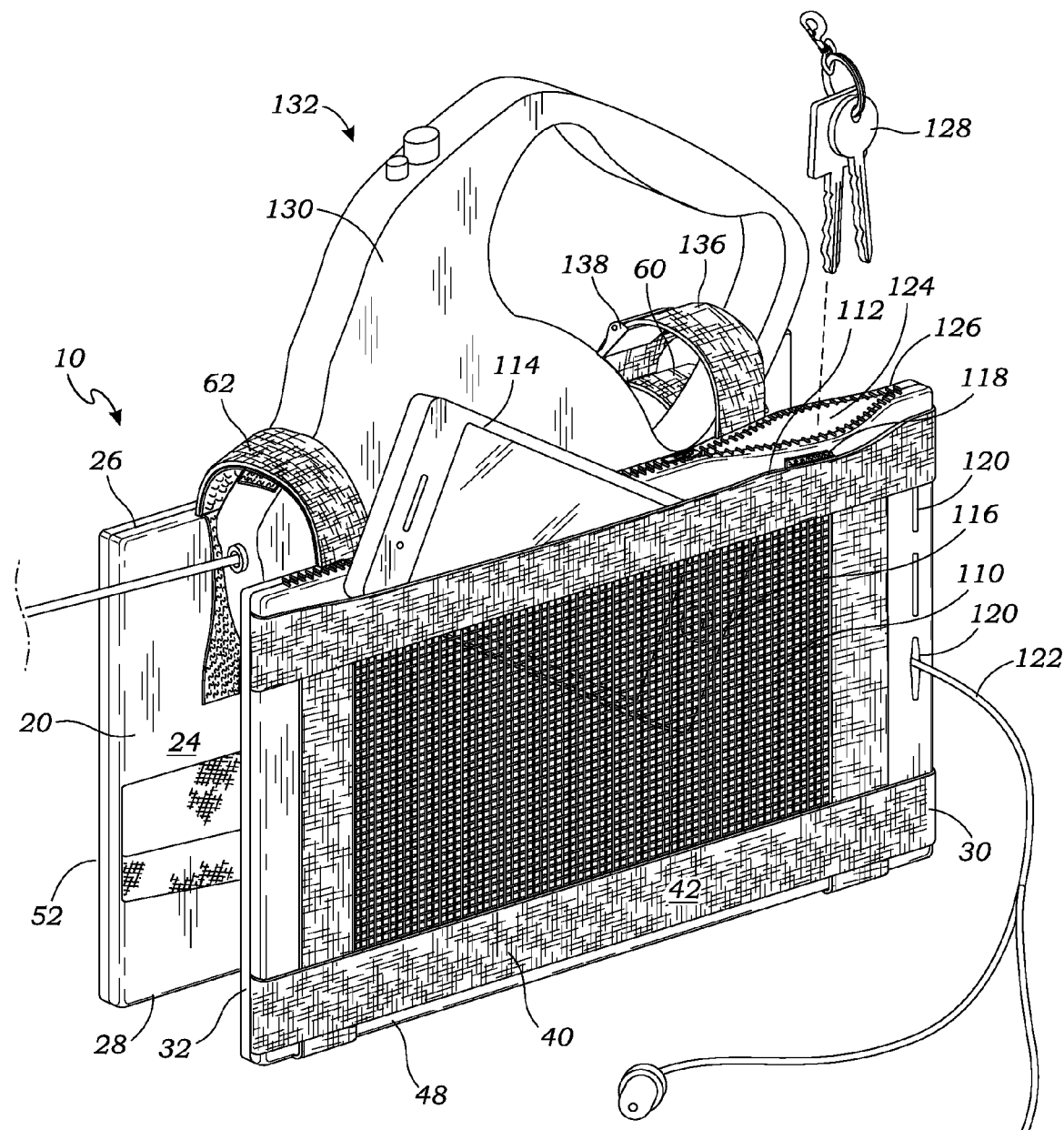
FIG. 3 is a perspective view of a second side of the leash pack, illustrating further compartments that may be used to hold additional accessories, the perspective view further illustrating the leash pack being mounted on a handle housing of a retractable leash.

FIG. 3 is a perspective view of a second side of the leash pack 10, illustrating further compartments that may be used to hold additional accessories. FIG. 3 also illustrates the leash pack 10 being mounted on a handle housing 130 of a retractable leash 132. As shown in FIG. 3, a fastener patch 134 (e.g., hooks and loops fastener) may be mounted (e.g., bonded) on the handle housing 130, which can attach to mating hooks and loops of the first connector strap 60. A pair of locking straps 136 positioned over the second connector strap 68, and connectable with a buckle 138 or similar structure, may be used to further fasten the leash pack 10 to the handle housing 130, as shown.

As illustrated in FIGS. 1-3, the leash pack 10 can be utilized with a wide range of leashes, from standard leashes shown in FIGS. 1-2, to retractable leashes shown in FIG. 3, and also including a large number of alternative types of leashes. Since the leash pack 10 may be utilized with a wide range of leashes, its use should not be restricted to a particular type of leash 12 unless specifically noted herein.

In this embodiment, the further compartments of the second storage compartment panel 40 include a cell phone compartment 110 that includes a opening 112 adjacent the top edge 26 of the second storage compartment panel 40, through which a cell phone 114 may be placed. An outer compartment wall 116 may be constructed of a material that enables viewing of the cell phone while it is within the cell phone compartment 110 (e.g., a mesh screen, as in the present embodiment, or a transparent plastic or other transparent material). This enables a user to check on the phone (e.g., if a call or text is received, etc.) without having to remove the cell phone. A fastener 118 (e.g., hooks and loops fasteners, snaps, a zipper, etc.) may be included for closing the cell phone compartment 110, to prevent the cell phone from falling out of the leash pack 10. An aperture 120 (or multiple apertures, in this case slots) extends through to the cell phone compartment 110 to permit cords 122 from the cell phone (e.g., headphones) to escape from the cell phone compartment 110 for use.

The further compartments of the second storage compartment panel 40 may further include a master compartment 124 in the second storage compartment panel 40, accessed by an opening 126 (e.g., zippered, or closed by another form of fastener) formed in the top edge 26 of the second storage compartment panel 40, which may be used for holding further articles, such as personal accessories 128 (e.g., keys, money, a wallet, etc.) and/or other pet related supplied (e.g., treats). The zippered opening 126 in this embodiment is through the top edge 26, although it may be located elsewhere in alternative embodiments. In this embodiment, zippered opening 126 extends almost the entire length of the top edge 26 of the second storage compartment panel 40 (i.e., at least 90% of the length).

Figure 4:
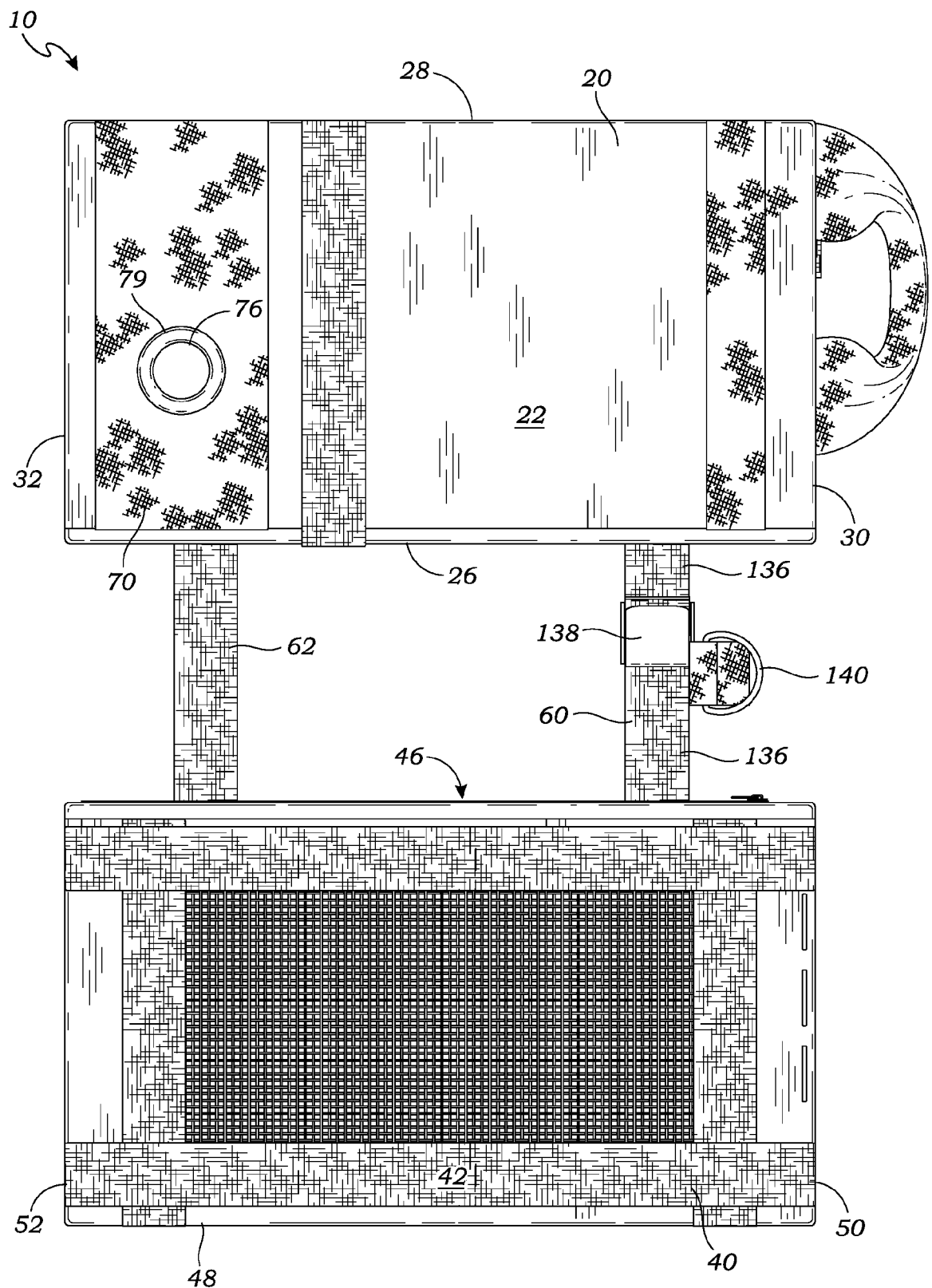
FIG. 4 is top plan view of the leash pack when it is lying flat in an open configuration.
Figure 10:
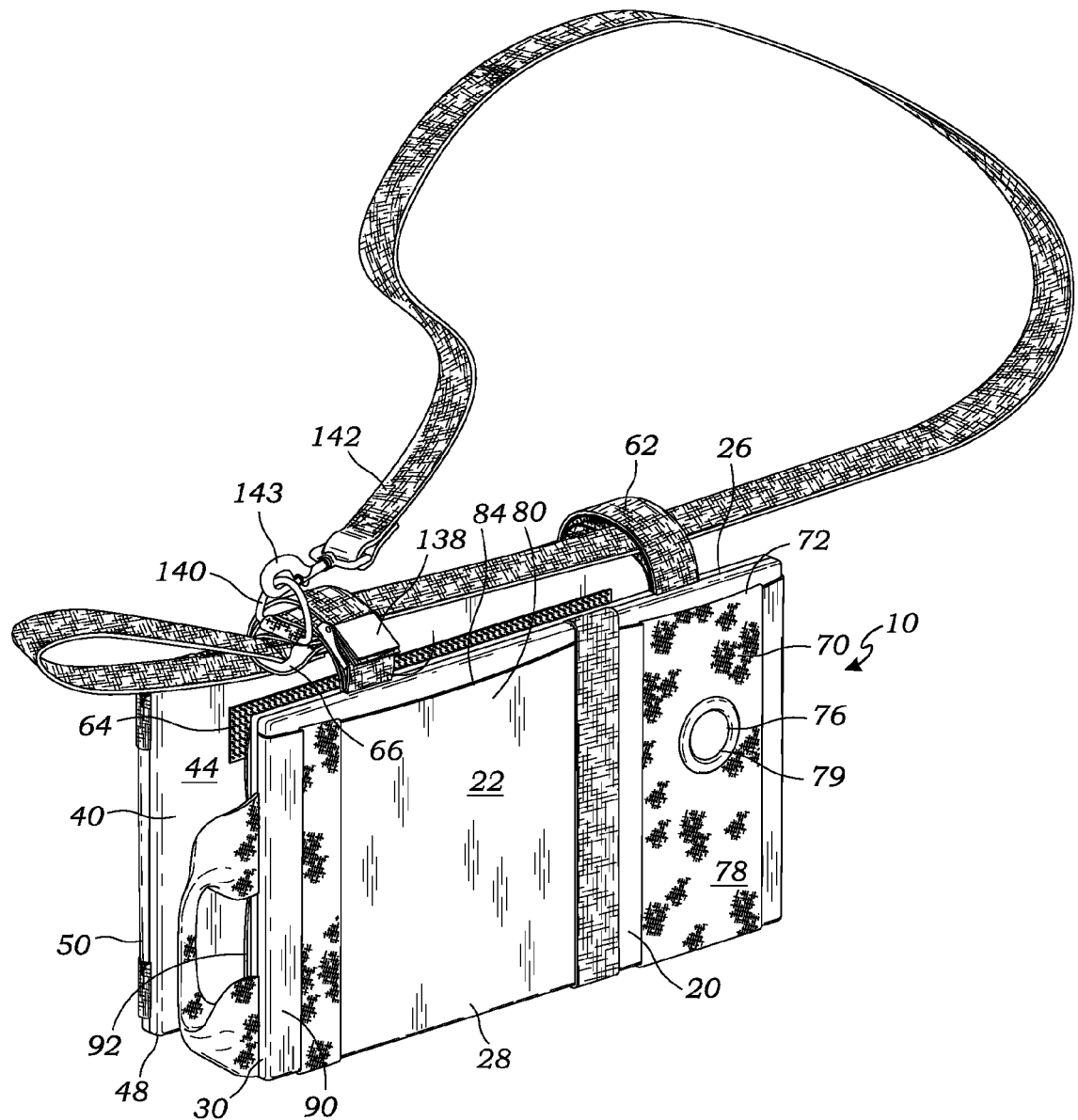
FIG. 10 is a perspective view of the leash pack of FIG. 1, illustrating a clip of the leash being attached to a utility ring of the leash pack.

FIG. 4 is top plan view of the leash pack 10 when it is lying flat in an open configuration. FIG. 4 illustrates the outer surfaces 22 of the first and second storage compartment panels 20 and 40, and various compartments discussed above. FIG. 4 also illustrates a utility ring 140 (e.g., D-ring) that may be used for various purposes, as discussed in greater detail below, and as shown in FIG. 10.

FIG. 5 is a bottom plan view of the leash pack 10, illustrating the inner surfaces 24 of the first and second storage compartment panels 40, and in particular showing the inner surface connectors 64, and the water bottle sleeve 90.

FIG. 6 is a rear elevational view of the leash pack 10 in the folded configuration, illustrating how lateral connectors connect the first and second storage compartment panels 20 and 40, and how the inner surface connectors 64 connect the first and second storage compartment panels 20 and 40.

FIG. 7 is a front elevational view of the leash pack 10 in the folded configuration, illustrating the water bottle opening 92 and an opening to the additional compartment, 100 both located along the front edge 30 of the first storage compartment panel 20.

FIG. 8 is top plan view of the leash pack 10, and FIG. 9 is a bottom plan view thereof, further illustrating the above-described features of the present invention.

FIG. 10 is a perspective view of the leash pack 10 of FIG. 1, illustrating a clip of the leash 12 being attached to the D-ring 140 of the leash pack 10, so that the leash 12 and the leash pack 10 together form a ring that can be hung over a user's shoulder, or a hanger for storage of the leash 12 and the leash pack 10.

As used in this application, the words "a," "an," and "one" are defined to include one or more of the referenced item unless specifically stated otherwise. Also, the terms "have," "include," "contain," and similar terms are defined to mean "comprising" unless specifically stated otherwise. Furthermore, the terminology used in the specification provided above is hereby defined to include similar and/or equivalent terms, and/or alternative embodiments that would be considered obvious to one skilled in the art given the teachings of the present patent application.

What is claimed is:

1. A leash pack for holding pet walking articles in association with a leash, the leash pack comprising:
   a first storage compartment panel and second storage compartment panel, the first and second storage compartment panels each including an outer surface and an opposed inner surface that extend to a top edge, a bottom edge, a front side edge, and a rear side edge;
   at least one storage compartment formed in the first storage compartment panel for holding at least some of the articles;
   at least one further compartment formed in the second storage compartment panel for holding further of the articles;
   a first connector strap that connects the top edges of the first and second storage compartment panels, wherein the first connector strap is proximate the front side edges;
   a second connector strap that connects the top edges of the first and second storage compartment panels, wherein the second connector strap is proximate the rear side edges;
   connectors disposed on the inner surfaces of each of the first and second storage compartment panels for removably joining the first and second storage compartment panels,
   wherein when the first and second storage compartment panels are draped over the leash to hang from the first and second connector straps, the connectors removably join the first and second storage compartment panels together so that the first and second storage compartment panels, the connectors, and the first and second connector straps form a loop around the leash for removably mounting the leash pack on the leash; and
   a stabilization strap connected to the first connector strap at one end and extending to another end having a fastener, such that the stabilization strap may be wrapped through a handle loop of the leash, and fastened to form a loop which secures the leash pack so that it cannot slide down the leash during use.

2. The leash pack of claim 1, wherein the at least one storage compartment includes a water bottle sleeve formed in the first storage compartment panel.

3. The leash pack of claim 2, wherein the water bottle sleeve includes a water bottle opening that is formed in part by the front edge of the first storage compartment panel.

4. The leash pack of claim 1, wherein the at least one further compartment formed in the second storage compartment panel includes a master compartment that includes an opening that is adjacent the top edge of the second storage compartment panel.

5. The leash pack of claim 4, wherein the master compartment has a zippered opening that extends almost the entire length of the top edge of the second storage compartment panel.

6. The leash pack of claim 1, wherein the at least one further compartment formed in the second storage compartment panel includes a cell phone compartment that includes an opening adjacent the top edge of the second storage compartment panel, the cell phone compartment having an outer compartment wall constructed of a mesh screen.

7. The leash pack of claim 6, further comprising a fastener for closing the cell phone compartment.

8. The leash pack of claim 7, further comprising a slot extending through to the cell phone compartment adjacent the front side edge of the second storage compartment panel.

9. The leash pack of claim 1, wherein the at least one storage compartment includes a bowl compartment formed in the first storage compartment panel for holding a portable pet bowl.

10. The leash pack of claim 1, wherein the at least one storage compartment includes a compartment formed in the first storage compartment panel for holding a flashlight.

11. The leash pack of claim 1, further comprising a D-ring attached to the first connector strap above the stabilization strap, such that when a clip of the leash is attached to the D-ring, and the stabilization strap is wrapped through the handle loop of the leash, the leash and the leash pack together form a ring that can be hung over a user's shoulder.

12. A leash pack for holding pet walking articles in association with a leash, the leash pack comprising:
  a first storage compartment panel and second storage compartment panel, the first and second storage compartment panels each including an outer surface and an opposed inner surface that extend to a top edge, a bottom edge, a front side edge, and a rear side edge;
  at least one storage compartment formed in the first storage compartment panel for holding at least some of the articles, wherein the at least one storage compartment includes a water bottle sleeve that includes a water bottle opening that is formed in part by the front edge of the first storage compartment panel;
  at least one further compartment formed in the second storage compartment panel for holding further of the articles, wherein the at least one further compartment includes a master compartment that includes an opening that is adjacent the top edge of the second storage compartment panel, wherein the master compartment has a zippered opening that extends almost the entire length of the top edge of the second storage compartment panel;
  a first connector strap that connects the top edges of the first and second storage compartment panels, wherein the first connector strap is proximate the front side edges;
  a second connector strap that connects the top edges of the first and second storage compartment panels, wherein the second connector strap is proximate the rear side edges;
  connectors disposed on the inner surfaces of each of the first and second storage compartment panels for removably joining the first and second storage compartment panels,
  wherein when the first and second storage compartment panels are draped over the leash to hang from the first and second connector straps, the connectors removably join the first and second storage compartment panels together so that the first and second storage compartment panels, the connectors, and the first and second connector straps form a loop around the leash for removably mounting the leash pack on the leash; and
  a stabilization strap connected to the first connector strap at one end and extending to another end having a fastener, such that the stabilization strap may be wrapped through a handle loop of the leash, and fastened to form a loop which secures the leash pack so that it cannot slide down the leash during use.

13. The leash pack of claim 12, wherein the at least one further compartment formed in the second storage compartment panel includes a cell phone compartment that includes an opening adjacent the top edge of the second storage compartment panel, the cell phone compartment having an outer compartment wall constructed of a mesh screen.

14. The leash pack of claim 13, further comprising a fastener for closing the cell phone compartment.

15. The leash pack of claim 13, further comprising a slot extending through to the cell phone compartment adjacent the front side edge of the second storage compartment panel.

16. The leash pack of claim 12, further comprising a D-ring attached to the first connector strap above the stabilization strap, such that when a clip of the leash is attached to the D-ring, and the stabilization strap is wrapped through the handle loop of the leash, the leash and the leash pack together form a ring that can be hung over a user's shoulder.

17. A method for holding pet walking articles in association with a leash of a type which includes a handle loop at one end and a clip at the other end, the method comprising the steps of:
  providing a leash pack comprising:
    a first storage compartment panel and a second storage compartment panel, the first and second storage compartment panels each including an outer surface and an opposed inner surface that extend to a top edge, a bottom edge, a front side edge, and a rear side edge;
    at least one storage compartment formed in the first storage compartment panel for holding at least some of the articles;
    at least one further compartment formed in the second storage compartment panel for holding further of the articles;
    a first connector strap that connects the top edges of the first and second storage compartment panels, wherein the first connector strap is proximate the front side edges;
    a second connector strap that connects the top edges of the first and second storage compartment panels, wherein the second connector strap is proximate the rear side edges;
    connectors disposed on the inner surfaces of each of the first and second storage compartment panels for removably joining the first and second storage compartment panels; and
    a stabilization strap connected to the first connector strap at one end and extending to another end having a fastener;
  draping the first and second storage compartment panels over the leash to hang from the first and second connector straps;
  joining the connectors of the first and second storage compartment panels so that the first and second storage compartment panels, the connectors, and the first and second connector straps form a loop around the leash for removably mounting the leash pack on the leash; and wrapping the stabilization strap through the handle loop of the leash, and fastened the stabilization strap to form a loop which secures the leash pack to the handle loop so that the leash pack cannot slide down the leash during use.

\* \* \* \* \*